United States Patent
Balmakhtar et al.

(10) Patent No.: US 10,313,193 B1
(45) Date of Patent: Jun. 4, 2019

(54) SOFTWARE DEFINED NETWORK (SDN) PROXY CORRELATION INDEX (PCI) INFORMATION DISTRIBUTION ACROSS AN SDN DATA-PLANE

(71) Applicant: Sprint Communications Company L.P., Overland Park, KS (US)

(72) Inventors: Marouane Balmakhtar, Dumfries, VA (US); Arun Rajagopal, Leawood, KS (US); Carl Joseph Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 77 days.

(21) Appl. No.: 15/637,647

(22) Filed: Jun. 29, 2017

(51) Int. Cl.
*H04J 3/22* (2006.01)
*H04L 12/24* (2006.01)
*H04L 12/26* (2006.01)
*G06F 9/44* (2018.01)
*H04L 29/08* (2006.01)

(52) U.S. Cl.
CPC ............ *H04L 41/0876* (2013.01); *G06F 9/44* (2013.01); *H04L 29/08* (2013.01); *H04L 41/50* (2013.01); *H04L 43/08* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 9,338,094 B2 | 5/2016 | Kotha et al. | |
| 2008/0240150 A1* | 10/2008 | Dias | H04L 41/5003 370/465 |
| 2009/0225763 A1* | 9/2009 | Forsberg | H04L 41/5003 370/401 |
| 2012/0137003 A1* | 5/2012 | Ferris | H04L 67/16 709/226 |
| 2013/0132561 A1* | 5/2013 | Pasala | H04L 67/1097 709/224 |
| 2013/0223226 A1 | 8/2013 | Narayanan et al. | |
| 2013/0250770 A1* | 9/2013 | Zou | H04L 47/19 370/238 |
| 2014/0119196 A1* | 5/2014 | Hui | H04W 24/10 370/241 |

(Continued)

FOREIGN PATENT DOCUMENTS

| | | |
|---|---|---|
| WO | 2014181335 | 11/2014 |
| WO | 2015121864 | 8/2015 |

(Continued)

*Primary Examiner* — Sithu Ko (57) ABSTRACT

A Software-Defined Network (SDN) distributes Proxy Correlation Index (PCI) information across an SDN data-plane. A central SDN controller receives inbound SDN signaling from a source SDN controller serving a source geographic area indicating a PCI threshold breach in the SDN data-plane in the source geographic area. The central SDN controller generates PCI information that characterizes the PCI threshold breach. The central SDN controller selects a target SDN controller in a target geographic area responsive to the PCI threshold breach. The central SDN controller transfers outbound SDN signaling having the PCI information for delivery to the target SDN controller in the target geographic area.

8 Claims, 6 Drawing Sheets

(56) References Cited

U.S. PATENT DOCUMENTS

| | | | |
|---|---|---|---|
| 2015/0058474 A1* | 2/2015 | Bloom | H04L 47/2425 709/224 |
| 2015/0063349 A1 | 3/2015 | Ardalan et al. | |
| 2015/0124622 A1 | 5/2015 | Kovvali et al. | |
| 2015/0127808 A1* | 5/2015 | Bragstad | H04L 43/04 709/224 |
| 2015/0188772 A1 | 7/2015 | Gasparakis | |
| 2015/0334045 A1* | 11/2015 | Tremblay | H04L 47/783 709/226 |
| 2016/0021135 A1 | 1/2016 | Chesla et al. | |
| 2016/0112275 A1* | 4/2016 | Park | H04L 41/147 709/224 |
| 2016/0205697 A1 | 7/2016 | Tan et al. | |
| 2016/0352866 A1* | 12/2016 | Gupta | H04L 67/42 |
| 2016/0352924 A1* | 12/2016 | Senarath | H04M 15/8016 |

FOREIGN PATENT DOCUMENTS

| | | |
|---|---|---|
| WO | 2016119822 | 8/2016 |
| WO | 2016139266 | 9/2016 |
| WO | 2016160007 | 10/2016 |

* cited by examiner

SOFTWARE DEFINED NETWORK (SDN) PROXY CORRELATION INDEX (PCI) INFORMATION DISTRIBUTION ACROSS AN SDN DATA-PLANE

TECHNICAL BACKGROUND

Data communication systems exchange user data for user devices to provide various data communication services. The user devices may be phones, computers, machines, and the like. The data communication services might be media conferencing, social networking, machine communications, or internet access. Software-Defined Networks (SDNs) are a popular data communication system. SDNs are made of applications, controllers, and data-plane machines.

SDN applications interact with users and other systems to deliver control-plane management of communication networks and users in the SDN. The SDN applications exchange SDN signaling, such as open flow, with SDN controllers to implement the control-plane management. The SDN controllers exchange SDN signaling like open flow with SDN data-plane machines. The SDN data-plane machines process user data flows based on Flow Description Tables (FDTs). The FDTs correlate header data like destination address to flow operations like packet drop or forward.

A Proxy Correlation Index (PCI) server transfers PCI configurations to the SDN controllers and data-plane machines. The PCI configurations have specific Key Performance Indicator (KPI) inputs and specific PCI inputs. The PCI configurations have PCI algorithms to generate PCIs from KPIs and other PCIs. The PCI configurations have other PCI algorithms that apply PCI thresholds to KPIs, PCIs, and to the result of KPI/PCI processing. The PCI configurations indicate corresponding SDN actions to take upon breach of these PCI thresholds. An exemplary SDN action might be to update an FDT in an SDN data-plane machine.

The SDN controllers and data-plane machines generate KPIs based on the PCI configurations. The SDN controllers and data-plane machines process the KPIs to generate the PCIs based on the PCI configurations and may process KPI/PCI combinations to generate PCIs. The SDN controllers and data-plane machines process their PCIs against PCI thresholds to determine PCI threshold breaches. The SDN controllers and data-plane machines and transfer PCI data about their PCI threshold breaches to the PCI server. The PCI server may process the PCIs and PCI breach data to initiate FDT updates for the SDN data-plane machines.

Unfortunately, the distribution of PCI data within the SDN remains inefficient and ineffective. Moreover, the distribution of PCI breach data across the SDN data-plane is poorly handled. The deployment of machine learning on an SDN-wide level is inhibited by this problem.

TECHNICAL OVERVIEW

A Software-Defined Network (SDN) distributes Proxy Correlation Index (PCI) information across an SDN data-plane. A central SDN controller receives inbound SDN signaling from a source SDN controller serving a source geographic area. The inbound SDN signaling indicates a PCI threshold breach in the SDN data-plane in the source geographic area. The central SDN controller generates PCI information that characterizes the PCI threshold breach. The central SDN controller selects a target SDN controller in a target geographic area responsive to the PCI threshold breach. The central SDN controller transfers outbound SDN signaling having the PCI information for delivery to the target SDN controller in the target geographic area.

DETAILED DESCRIPTION

Figure 1:
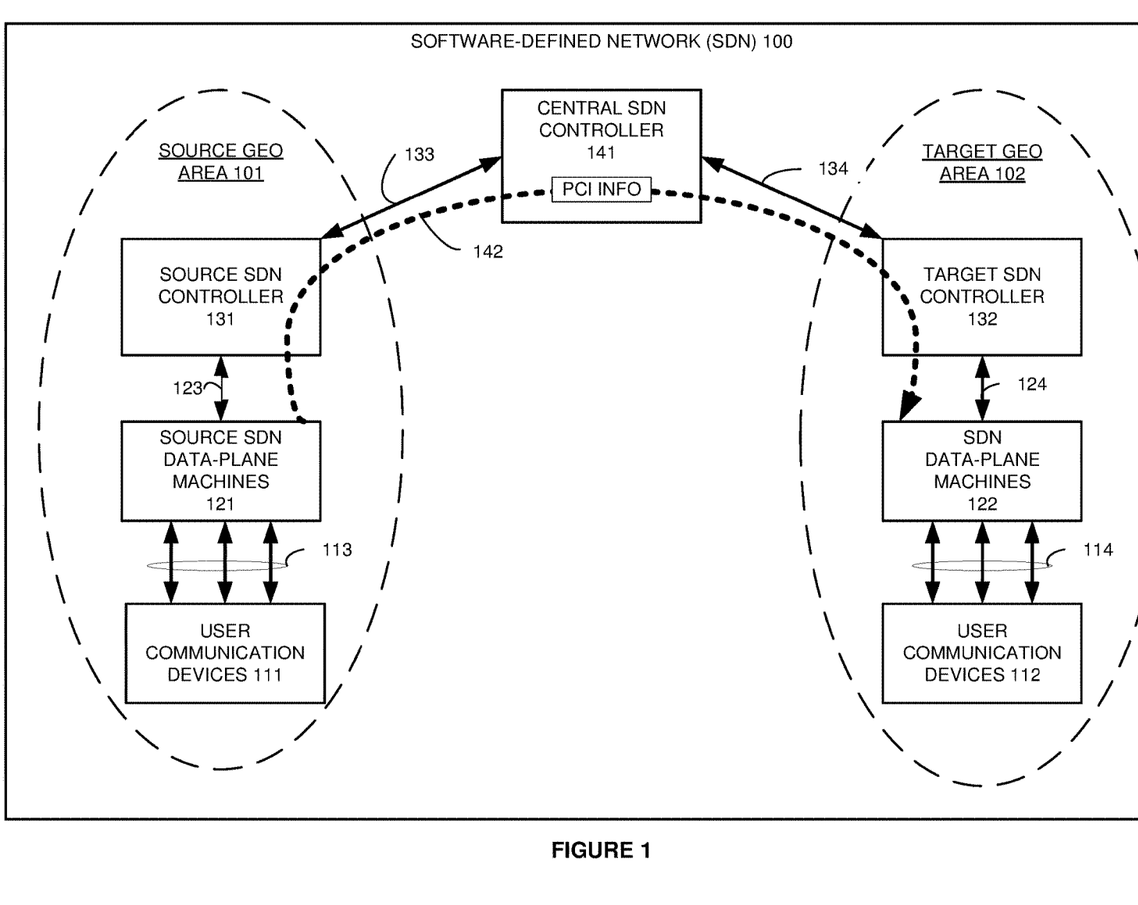
FIGS. 1-2 illustrate a Software-Defined Network (SDN) to distribute Proxy Correlation Index (PCI) information across an SDN data-plane.
Figure 2:
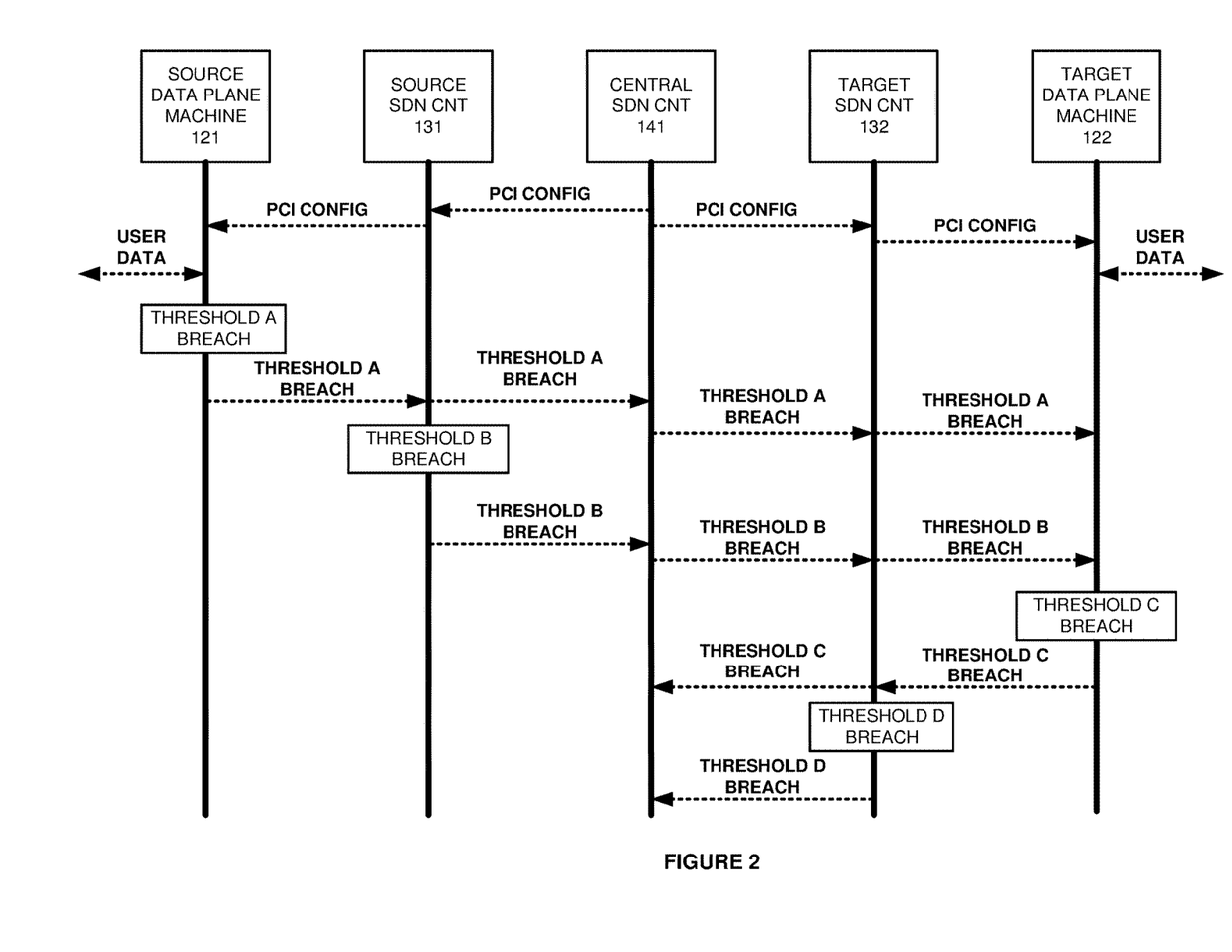

FIGS. 1-2 illustrate Software-Defined Network (SDN) 100 to distribute Proxy Correlation Index (PCI) information across an SDN data-plane. Referring to FIG. 1, SDN 100 comprises user communication devices 111-112, SDN data-plane machines 121-122, and SDN controllers 131-132 and 141. Source geographic area 101 includes user communication devices 111, source SDN data-plane machines 121, and source SDN controller 131. Target geographic area 102 includes user communication devices 112, target SDN data-plane machines 122, and target SDN controller 132. Geographic areas 101 and 102 comprise zip codes, cities, states, national regions, tracking areas, or some other geographically-bounded zone. Geographic areas 101 and 102 are mutually exclusive in this example, although geographic areas 101-102 may be nested or overlapping in other examples.

User communication devices 111-112 comprise computers, phones, and/or some other data transceivers. User communication devices 111-112 exchange user data 113-114 with SDN data machines 121-122 to receive data services like content streaming, social networking, machine communications, internet access, or some other computerized information service.

SDN data-plane machines 121-122 process user data 113-114 based on Flow Description Tables (FDTs) to deliver the data services. SDN data-plane machines 121-122 configure their FDTs based on SDN signaling 123-124 from SDN controllers 131-132. SDN data-plane machines 121-122 are made of computer hardware like Central Processing Units (CPUs), Random Access Memory (RAM), persistent data storage, bus interfaces, and data transceivers. SDN data-plane machines 121-122 also have computer software like operating systems, flow control engines, PCI controllers, and signaling interfaces.

Central SDN controller 141 directs SDN controllers 131-132 over SDN signaling 133-134 to support the data services. SDN controllers 131-132 direct SDN data-plane machines 121-122 over SDN signaling 123-124 to deliver the data services. SDN controllers 131-132 and 141 are made of computer hardware like CPUs, RAM, persistent data storage, bus interfaces, and data transceivers. SDN controllers 131-132 and 141 also have computer software like operating systems, subnetwork controllers, data service controllers, and signaling interfaces. In some examples, SDN controllers 131-132 and 141 comprise Network Function Virtualization (NFV) servers that execute SDN controller Virtual Network Functions (VNFs) and perhaps SDN application VNFs.

SDN 100 generates Key Performance Indicators (KPIs) that characterize SDN operations. The KPIs may be specifically measured for a given subnetwork, geographic area, and data service. Exemplary KPIs include packet counts, header data, CPU occupancy, memory status, flow metrics, and the like. SDN 100 processes the KPIs to generate the PCIs. An exemplary PCI comprises specific KPIs that are normalized, weighted, and averaged to generate an index score.

Central SDN controller 141 generates PCI configurations. Central SDN controller 141 transfers PCI configurations in SDN signaling 133-134 to SDN controllers 131-132. SDN controllers 131-132 transfer PCI configurations in SDN signaling 123-124 to SDN data-plane machines 121-122. The PCI configurations have specific KPI inputs and specific PCI inputs. The PCI configurations have PCI algorithms to generate the PCIs from the KPIs and possibly from other PCIs. The PCI configurations have other PCI algorithms that apply PCI thresholds to KPIs, PCIs, and to the results of additional KPI/PCI processing. The PCI configurations also indicate corresponding SDN actions to take upon breach of a PCI threshold. For example, a PCI algorithm may direct data-plane machine 121 to modify its FDT based on a breach of a data throughput threshold for a given subnetwork and data service.

SDN controllers 131-132 and 141 and data-plane machines 121-122 generate KPIs based on the PCI configurations. SDN controllers 131-132 and 141 and data-plane machines 121-122 process the KPIs to generate PCIs based on the PCI configurations and may process KPI/PCI combinations to generate PCIs. SDN data-plane machines 121-122 transfer their KPIs and PCIs in SDN signaling 123-124 to SDN controllers 131-132. SDN controllers 131-132 transfer these KPIs and PCIs in addition to their own KPIs and PCIs in SDN signaling 133-134 to central SDN controller 141.

SDN controllers 131-132 and 141 and data-plane machines 121-122 process PCIs against PCI thresholds to determine PCI threshold breaches. SDN data-plane machines 121-122 transfer data characterizing their PCI threshold breaches in SDN signaling 123-123 to SDN controllers 131-132. SDN controllers 131-132 transfer this PCI breach data in addition to their own PCI breach data in SDN signaling 133-134 to central SDN controller 141.

Advantageously, central SDN controller 141 intelligently distributes PCI information about these PCI threshold breaches to SDN controllers 131-132 and to data-plane machines 121-122. Consider an example where source SDN data plane machines 121 implement a PCI configuration having specific KPI/PCI inputs, algorithms, thresholds, and SDN actions upon breach. One of these source data-plane machines 111 then detects a PCI threshold breach and transfers SDN signaling 123 characterizing the PCI threshold breach to source SDN controller 131. Source SDN controller 131 transfers SDN signaling 133 characterizing the PCI threshold breach to central SDN controller 141.

Central SDN controller 141 receives SDN signaling 133 from source SDN controller 131 characterizing the PCI threshold breach in source geographic area 101. Central SDN controller 141 processes SDN signaling 133 to generate PCI information that characterizes the PCI threshold breach. The PCI information indicates the specific KPI/PCI inputs, algorithms, thresholds, breaches, breach frequency, actions taken, and the like. The PCI information typically correlates the PCI threshold breach to a specific subnetwork, data service, user group, geographic area, data-plane machine, and the like.

To distribute the PCI information, central SDN controller 141 selects target SDN controller 132 and target SDN data-plane machines 122 in target geographic area 102 based on data about the PCI threshold breach. Central SDN controller 141 maintains a data structure that is entered with PCI threshold breach data (subnetwork, data service, geographic area, user group, SDN controller, data-plane machine, PCI, PCI algorithm, PCI threshold, and action taken). The data structure yields a distribution list for PCI information about the breach. In this example, data for the PCI threshold breach in source geographic area 101 is used to yield a PCI information distribution list that includes target SDN controller 132 and target SDN data-plane machines 122 in target geographic area 102.

Central SDN controller 141 transfers SDN signaling 134 having the PCI information to target SDN controller 132 in target geographic area 102. Target SDN controller 132 transfers SDN signaling 124 having the PCI information to target SDN data-plane machines 122 in target geographic area 102. Target SDN controller 132 and target SDN data-plane machines 122 then use the PCI information. For example, the PCI threshold breach in source data-plane machines 121 could be a PCI input into a PCI algorithm for a PCI configuration running in target data-plane machines 122. The intelligent distribution of PCI information in the SDN data-plane enables distributed SDN-wide PCI configurations across the data-plane. These SDN-wide PCI configurations can be used to load balance data services, defeat security threats, enforce service quality, and the like.

Referring to FIG. 2, an exemplary operation of SDN 100 is illustrated. Central SDN controller 141 transfers PCI configurations to SDN controllers 131-132. The PCI configurations indicate KPIs, PCIs, PCI algorithms, PCI thresholds, and corresponding SDN actions upon threshold breach. SDN controllers 131-132 transfer PCI configurations to SDN data-plane machines 121-122.

SDN data-plane machines 121-122 exchange user data with user communication devices to deliver data services. To characterize the data exchange, SDN data-plane machine 121 generates KPIs and processes the KPIs to generate PCIs per its PCI configuration. SDN data-plane machine 121 inputs the KPIs and PCIs into PCI algorithms that have PCI thresholds. In this example, SDN data-plane machine 121 detects a breach of PCI threshold "A". An exemplary threshold "A" breach might occur when a CPU/memory usage index exceeds a usage threshold for a given data service on a particular subnet. SDN data-plane machine 121 transfers SDN signaling characterizing the threshold "A" breach data to source SDN controller 131.

Source SDN controller 131 receives the SDN signaling characterizing the PCI threshold "A" breach at source data-plane machine 121. Source SDN controller 131 transfers SDN signaling characterizing the threshold "A" breach to central SDN controller 141. Central SDN controller 141 receives the SDN signaling characterizing the threshold "A" breach which occurred at SDN data-plane machine 121.

Central SDN controller 141 processes the SDN signaling to generate PCI information that characterizes the PCI threshold "A" breach. The PCI information indicates the specific KPI/PCIs, algorithms, threshold "A", threshold "A" breach frequency, actions taken upon breach, and the like. The PCI information typically correlates the threshold "A" breach to a specific subnetwork, data service, user group, geographic area, data-plane machine, and the like.

Central SDN controller 141 determines a distribution list for the PCI information by entering a data structure with data characterizing the threshold "A" breach. In this example, central SDN controller 141 selects target SDN controller 132 and target data-plane machine 122. Central SDN controller 141 transfers the PCI information characterizing the threshold "A" breach to target SDN controller 132. Target SDN controller 132 transfers the PCI information characterizing the threshold "A" breach to target SDN data-plane machine 122.

Source SDN controller 131 generates KPIs and processes the KPIs to generate PCIs. Source SDN controller 131 inputs the KPIs and PCIs into PCI algorithms having PCI thresholds. In this example, source SDN controller 131 detects a breach of PCI threshold "B" by using the threshold "A" breach as a PCI algorithm input. An exemplary PCI threshold "B" breach might occur when threshold "A" is breached and when an SDN signaling load at source SDN controller 131 exceeds a threshold for the data service. Source SDN controller 131 transfers SDN signaling characterizing the threshold "B" breach data to central SDN controller 141.

Central SDN controller 141 receives the SDN signaling characterizing the threshold "B" breach that occurred at source SDN controller 131. Central SDN controller 141 processes the SDN signaling to generate PCI information that characterizes the PCI threshold "B" breach. The PCI information indicates KPI/PCI inputs, algorithms, threshold "B", threshold "B" breach frequency, actions taken, and the like. The PCI information usually correlates the threshold "B" breach to a specific subnetwork, data service, user group, geographic area, data machine, and the like.

Central SDN controller 141 determines a distribution list for the PCI information by entering a data structure with data characterizing the threshold "B" breach. In this example, central SDN controller 141 selects target SDN controller 132 and target data-plane machine 122. Central SDN controller 141 transfers the PCI information characterizing the threshold "B" breach to target SDN controller 132. Target SDN controller 132 transfers the PCI information characterizing the threshold "B" breach to target SDN data-plane machine 122.

Target SDN data-plane machine 122 generates KPIs and processes the KPIs to generate PCIs. Target SDN data-plane machine 122 inputs KPIs and PCIs into PCI algorithms having PCI thresholds. In this example, target SDN data-plane machine 122 detects a breach of PCI threshold "C". An exemplary PCI threshold "C" breach might occur when PCI threshold breaches "A" and "B" are reported and when a CPU/memory usage index exceeds a usage threshold for the data service and subnetwork.

Central SDN controller 141 receives the SDN signaling characterizing the threshold "C" breach at SDN data-plane machine 122. Central SDN controller 141 processes the SDN signaling to generate PCI information that characterizes the PCI threshold "C" breach. The PCI information indicates KPI/PCI inputs, algorithms, threshold "C", threshold "C" breach frequency, actions taken, and the like. The PCI information may correlate the threshold "C" breach to a specific subnetwork, data service, user group, geographic area, data machine, and the like.

Target SDN controller 132 generates KPIs and processes the KPIs to generate PCIs. Target SDN controller 132 inputs the KPIs and PCIs into PCI algorithms having PCI thresholds. In this example, target SDN controller 132 detects a breach of PCI threshold "D" by using the breaches of PCI thresholds "A", "B", and "C" as PCI inputs. An exemplary PCI threshold "D" breach might occur when the PCI threshold "A", "B", and "C" breaches occur and when the SDN signaling load exceeds a load threshold for the data service. Target SDN controller 132 transfers SDN signaling characterizing the threshold "D" breach data to central SDN controller 141. Although not shown for clarity, central SDN controller 141 generates and distributes PCI information for the PCI threshold "C" and "D" breaches.

By implementing machine learning, PCI threshold "B" may be lower than normal because the the breach of PCI threshold "A" is also considered. Likewise, PCI threshold "C" may be lower due to the use of breaches of PCI thresholds "A" and "B." PCI threshold "D" may also be lower due to the breaches of PCI thresholds "A", "B", and "C". The PCI configurations depicted on FIG. 2 represent an SDN-wide PCI configuration for a specific data service on a given subnet. SDN-wide machine learning can be introduced through central SDN controller 141.

Figure 3:
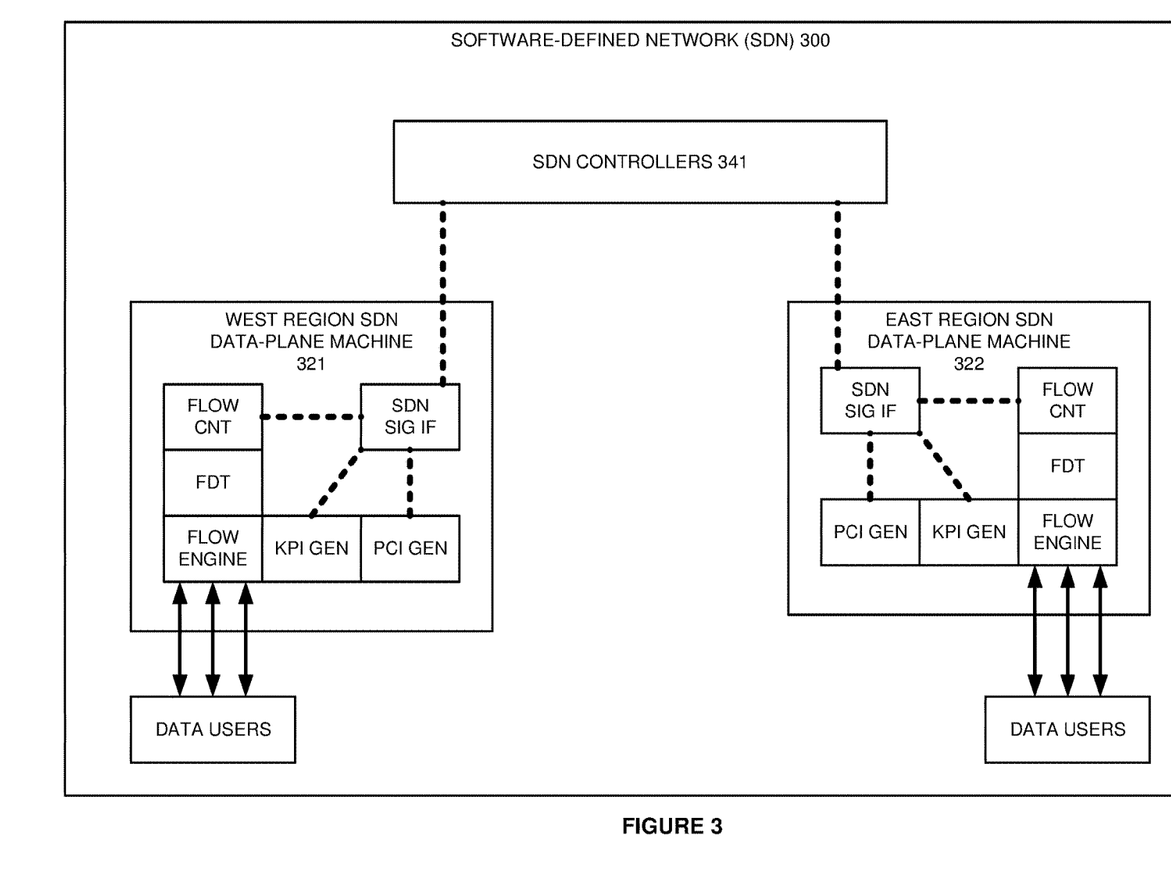
FIGS. 3-4 illustrate an SDN to distribute PCI information across an SDN data-plane.
Figure 4:
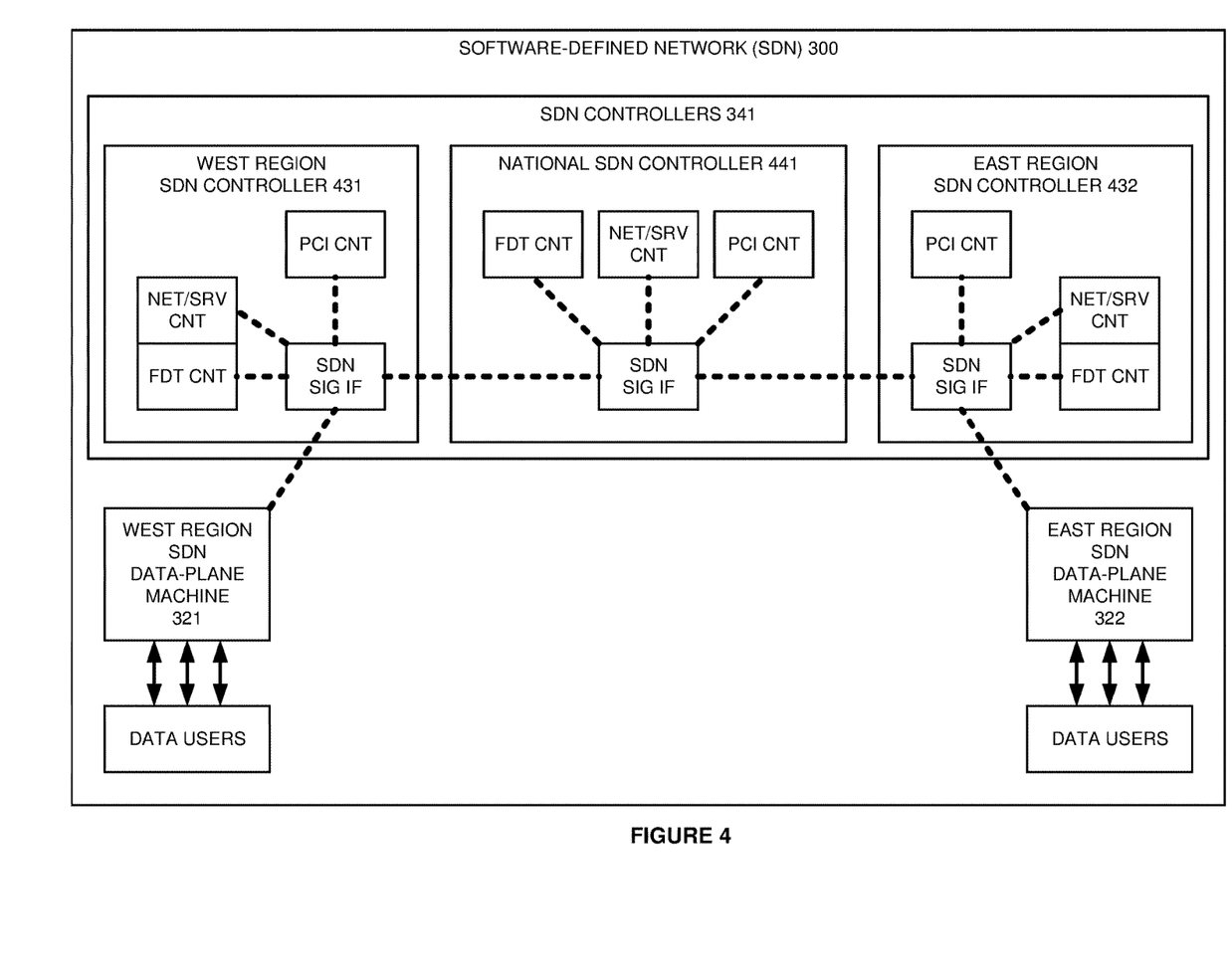

FIGS. 3-4 illustrate SDN 300 to distribute PCI information across an SDN data-plane. SDN 300 is an example of SDN 100, although SDN 100 may use alternative configurations and operations. Referring to FIG. 3, SDN 300 comprises west region SDN data-plane machine 321, east region SDN data-plane machine 322, and SDN controllers 341. SDN data-plane machines 321-322 each comprise an SDN signaling interface (SIG IF), flow controller (CNT), File Description Table (FDT), flow engine, Key Performance Indicator (KPI) generator (GEN), and Proxy Correlation Index (PCI) generator. The west region and the east region represent mutually exclusive geographic areas.

SDN controllers 341 have numerous SDN controllers that are regionalized in a top-down hierarchy from a few controllers at the top and many controllers at the bottom. The SDN controllers at the bottom of the hierarchy typically have direct signaling links to SDN data-plane machines 321-322. SDN controllers 341 comprise a distributed set of Network Function Virtualization (NFV) servers that execute a distributed set of SDN controller Virtual Network Functions (VNFs).

The flow engines in SDN data-plane machines 321-322 exchange and process user data based on their FDTs to deliver data services to data users. The flow controllers in SDN data-plane machines 321-322 configure their FDTs based on SDN instructions from the SDN signaling interfaces. The SDN signaling interfaces exchange SDN signaling with SDN controllers 341 to control the data services.

SDN controllers 341 transfer PCI configurations to SDN data plane machines 321-322. The PCI configurations have KPI/PCI inputs, processing algorithms, algorithm thresholds, and corresponding SDN actions. For example, a PCI algorithm may direct data-plane machine 321 to modify its FDT based on a breach of a data throughput threshold for a given subnetwork and data service. SDN data-plane machines 321-322 generate specific KPIs based on the PCI configurations. SDN data-plane machines 321-322 process these KPIs to generate PCIs based on the PCI configurations. SDN data-plane machines 321-322 transfer the KPIs and PCIs in SDN signaling to SDN controllers 341. SDN controllers 341 also generate KPIs based on the PCI configurations. SDN controllers 341 process the KPIs and PCIs to generate more PCIs based on the PCI configurations.

Data plane machines 321-322 implement the PCI configurations by applying thresholds to PCIs and taking corresponding SDN actions when the PCI thresholds are breached. Data plane machines 321-322 transfer PCI information characterizing PCI threshold breaches to SDN controllers 341. Likewise, SDN controllers 341 implement PCI configurations that apply thresholds to PCIs and take corresponding SDN actions when the PCI thresholds are breached.

Advantageously, SDN controllers 341 distribute PCI information about these PCI threshold breaches to SDN data-plane machines 321-322. Consider an example where SDN data plane machines 321-322 implement a PCI configuration having specific KPI/PCI inputs, PCI algorithms, algorithm thresholds, and corresponding SDN actions upon breach. The PCI generator in east region SDN data-plane machine 322 detects a PCI threshold breach and directs the SDN signaling interface to transfer SDN signaling characterizing the PCI threshold breach to SDN controllers 341.

SDN controllers 341 receive the SDN signaling from east region SDN data-plane machine 322 characterizing the PCI threshold breach. SDN controllers 341 process the SDN signaling to generate PCI information that characterizes the PCI threshold breach in the east region. The PCI information indicates the specific KPI/PCI inputs, algorithms, thresholds, breaches, breach frequency, actions taken, and the like. The PCI information typically correlates the PCI threshold breach to a specific SDN subnet, data service, user group, geographic area, data-plane machine, and the like.

To distribute the PCI information, SDN controllers 341 select west region SDN data-plane machine 321 responsive to the PCI threshold breach in the east region. SDN controllers 341 maintain data structures correlate PCI threshold breach data (subnetwork, data service, geographic area, user group, SDN controller, data-plane machine, PCI, PCI algorithm, PCI threshold, action taken) with network destinations for the PCI threshold breach data. The data structures yield distribution lists for the PCI information. In this example, the PCI breach data from the east region yields a distribution list that includes SDN data plane machine 321 in the west region.

SDN controllers 341 transfer SDN signaling having the PCI information to west region SDN data-plane machine 321. SDN data-plane machine 321 may then use the PCI information. For example, the PCI threshold breach in the east region may be a PCI input to a PCI algorithm for a PCI configuration running in west region data-plane machine 321. The PCI configurations in the east and west data planes may be integrated by sharing KPIs, PCIs, and breach data through SDN controllers 341. The KPIs, PCIs, and PCI breach data form inputs into the PCI algorithms running in the SDN data-plane.

Referring to FIG. 4, SDN 300 again comprises west region SDN data-plane machine 321, east region SDN data-plane machine 322, and SDN controllers 341. SDN controllers 341 comprise west region SDN controller 431, east region SDN controller 432, and national SDN controller 441. SDN controllers 431-432 and 441 each comprise an SDN signaling interface (SIG IF), FDT controller (CNT), network and service (NET/SRV) controller, and Proxy Correlation Index (PCI) controller. SDN controllers 341 typically comprise numerous SDN controllers that are regionalized in a top-down hierarchy from a few controllers at the top and many controllers at the bottom that are geographically regionalized. For clarity, a two-layer hierarchy is illustrated with SDN controllers 431-432 and 441.

In SDN controllers 431-432, the SDN signaling interfaces exchange SDN signaling with SDN data-plane machines 321-322 to control the data services. The FDT controllers direct FDT updates in SDN data-plane machines 321-322 to control the delivery of the data services to the data users. The network and service controllers direct the FDT controllers to control the data services. An exemplary direction from the network and service controllers to the FDT controllers might be to add a new user data flow to an FDT.

In SDN controllers 431-432 and 441, the PCI controllers transfer PCI configurations to SDN data plane machines 321-322. The PCI configurations have KPI/PCI inputs, processing algorithms, algorithm thresholds, and corresponding SDN actions. For example, a PCI algorithm may direct data-plane machine 322 to modify its FDT based on a breach of a security alert threshold for a given subnetwork and data service. SDN data-plane machines 321-322 generate specific KPIs responsive to the PCI configurations. SDN data-plane machines 321-322 process these KPIs to generate PCIs responsive to the PCI configurations.

SDN data-plane machines 321-322 transfer the KPIs and PCIs in SDN signaling to regional SDN controllers 431-432. Regional SDN controllers 431-432 transfer their KPIs and PCIs in SDN signaling to national SDN controller 441. SDN controllers 431-432 and 441 also generate KPIs and PCIs based on the PCI configurations.

SDN data plane machines 321-322 implement the PCI configurations by applying thresholds to PCIs and initiating SDN actions when the PCI thresholds are breached. SDN data plane machines 321-322 transfer PCI information characterizing the PCI threshold breaches to the PCI controllers in regional SDN controllers 431-432. These PCI controllers implement PCI configurations by applying thresholds to their own PCIs and taking corresponding SDN actions when their PCI thresholds are breached. These PCI controllers signal the threshold breach data to the PCI controller in national SDN controller 441. This national PCI controller may also implement PCI configurations by applying thresholds to its own PCIs and taking corresponding SDN actions when its PCI thresholds are breached.

Advantageously, the national PCI controller in SDN controller 441 distributes PCI information about PCI threshold breaches to regional SDN data-plane machines 321-322. Consider an example where SDN data plane machines 321-322 implement a PCI configuration having specific KPI/PCI inputs, PCI algorithms, algorithm thresholds, and corresponding SDN actions upon breach. East region SDN data-plane machine 322 detects a PCI threshold breach and transfers SDN signaling characterizing the PCI threshold breach to east region SDN controller 432.

East region SDN controller 432 receives the SDN signaling from east region SDN data-plane machine 322 characterizing the PCI threshold breach. East region SDN controller 432 applies the breach data to its own PCI configuration. East region SDN controller 432 transfers SDN signaling to national SDN controller 441 characterizing the PCI threshold breach. The PCI controller in national SDN controller 441 processes the SDN signaling to generate PCI information that characterizes the PCI threshold breach in the east region. The PCI information indicates the specific KPI/PCI inputs, algorithms, thresholds, breaches, breach frequency, actions taken, and the like. The PCI information typically correlates the PCI threshold breach to a specific SDN subnet, data service, user group, geographic area, data-plane machine, and the like.

The PCI controller in national SDN controller 441 selects endpoints for PCI information distribution responsive to the PCI threshold breach in the east region. In this example, the PCI controller selects west region SDN data-plane machine 321. The PCI controller maintains a data structure that correlates PCI threshold breach data (subnetwork, data service, geographic area, user group, SDN controller, data-plane machine, PCI, PCI algorithm, PCI threshold, action taken) to SDN destinations for the PCI information about the specific threshold breaches. In this example, the data for the PCI threshold breach in the east region yields a PCI information distribution list that includes SDN data plane machine 321 in the west region.

The PCI controller in national SDN controller 441 transfers SDN signaling having the PCI information to the PCI controller in west region SDN controller 431. The PCI controller in west region SDN controller 431 transfers SDN signaling having the PCI information to west region SDN data-plane machine 321. West region SDN controller 441 and data-plane machine 321 may then use the PCI information. For example, the PCI threshold breach in the east region may be a PCI input to a PCI algorithm running in west region data-plane machine 321. The PCI configurations in east and west SDN controllers 431-432 may be integrated by sharing KPIs, PCIs, and breach data through national SDN controller 441. The KPIs, PCIs, and PCI breach data can form inputs into PCI algorithms running in the SDN control-plane.

Figure 5:
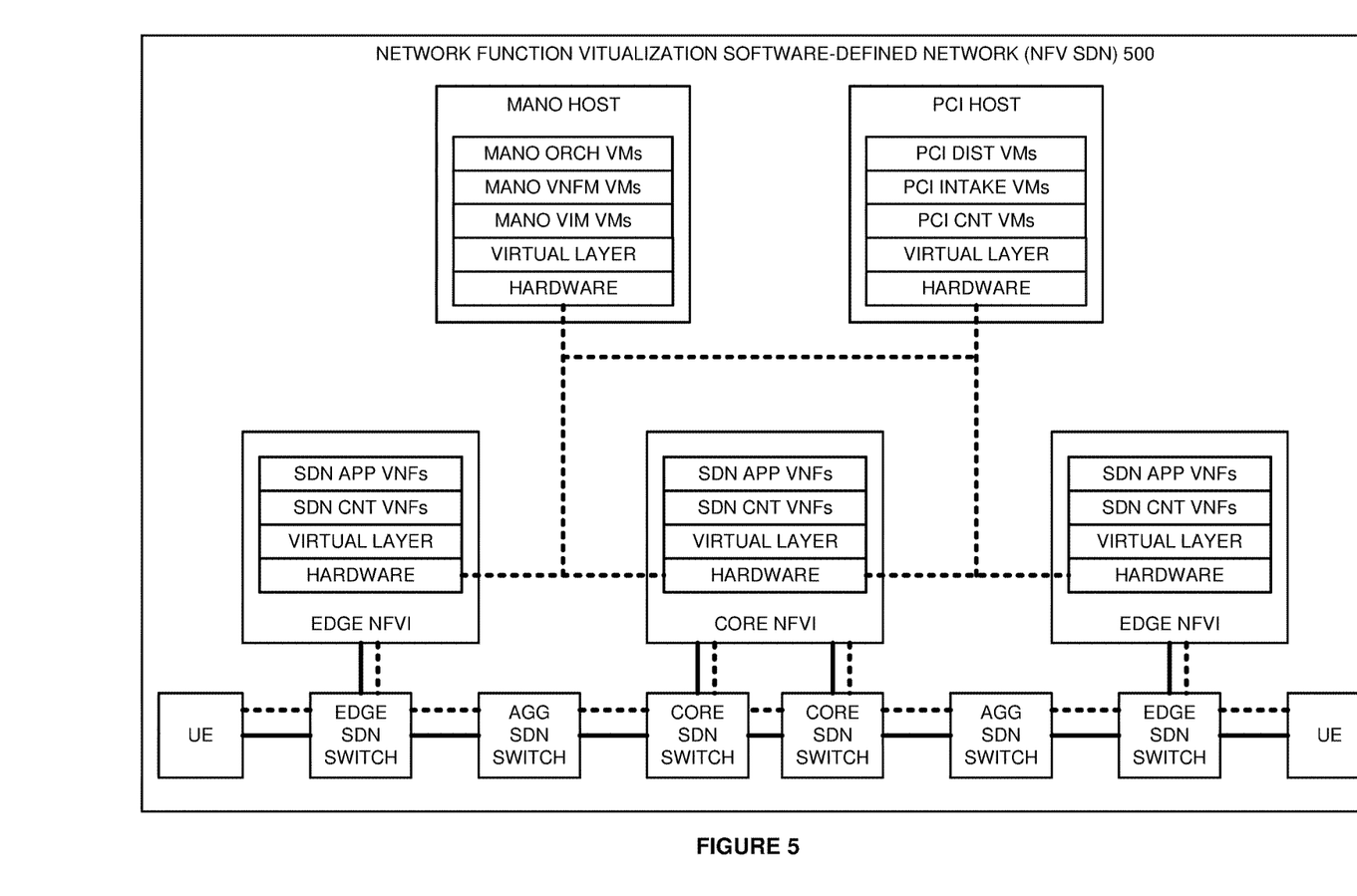
FIG. 5 illustrates a Network Function Virtualization (NFV) SDN to distribute PCI information across an SDN data-plane.

FIG. 5 illustrates a Network Function Virtualization (NFV) SDN 500 to distribute PCI information across an SDN data-plane. NFV SDN 500 is an example of SDN 100, although SDN 100 may use alternative configurations and operations. NFV SDN 500 comprises: User Equipment (UE), edge SDN switches, aggregation (AGG) SDN switches, core SDN switches, edge NFV Infrastructures (NFVIs), core NFVI, Management and Orchestration (MANO) host, and PCI host. The NFVIs comprise hardware such as server blades with CPU cores, data memories, transceivers, and the like. The edge SDN switches may include wireless base station VNFs that drive nearby wireless transceivers to exchange wireless data with the UEs.

The NFVIs execute virtual layer software to provide a virtualized processing environment to VNFs and virtual machines. The virtual layer comprises virtual hardware interfaces, hypervisors, operating systems, and NFVI controllers. Under the control of the MANO host, the virtual layers support various SDN VNFs. In the edge and core NFVIs, the virtual layers support SDN controller (CNT) VNFs and SDN application (APP) VNFs. In the MANO host, the virtual layer supports Virtual Machines (VMs) for MANO Virtual Infrastructure Managers (VIMs), VNF Managers (VNFMs), and Orchestrators (ORCHs). In the PCI host, the virtual layer supports VMs for PCI controllers, PCI intake engines (INTAKE), and PCI distributors (DIST).

Under the direction of the MANO ORCHs, the VIMs and VNFMs transfer networking data to the edge and core virtual layers to drive the execution of the SDN APP and CNT VNFs. To set-up a data session between the UEs, one of the UEs transfers a session request to an SDN application VNF. The SDN application VNF informs other SDN application VNFs to extend the session. The SDN VNFs transfer SDN controller API calls for the UE session to their associated SDN controller VNFs. The SDN controller VNFs transfer SDN data machine API calls to the SDN switches.

API responses flow back from the SDN switches to the SDN controller VNFs and to the SDN application VNFs. If needed, an SDN application VNF may direct an SDN controller VNF to drive an SDN data machine to deliver user data to an NFVI for heavier processing by NFV data-processing VNFs. For example, a given flow may be directed to a VNF to perform packet inspection, encryption, or the like. The SDN switches process user data flows per FDTs.

The PCI controller in the PCI host transfers SDN signaling with PCI configurations to the SDN controller VNFs. The SDN controller VNFs transfer SDN signaling with the PCI configurations to the SDN switches in the data-plane. The PCI configurations have KPI/PCI inputs, processing algorithms, algorithm thresholds, and corresponding SDN actions. For example, a PCI algorithm may direct an edge SDN switch to modify its FDT based on a breach of an SDN signaling threshold for a given subnetwork and data service.

The SDN switches generate specific KPIs responsive to the PCI configurations. The KPIs indicate packet counts and data latency per network address and port for different types of user data packets. The KPIs also indicate switch performance like CPU usage and RAM capacity. The SDN switches process the KPIs to generate PCIs responsive to PCI configurations. The SDN switches process the PCIs to implement FDT updates based on PCI configurations.

The SDN switches transfer the KPIs and PCIs in SDN signaling to the SDN controller VNFs. The SDN controller VNFs receive the KPIs and PCIs from the SDN switches. The SDN controller VNFs also generate KPIs based on PCI configurations. The SDN controller VNFs process KPIs and PCIs to generate PCIs based on PCI configurations. The SDN controller VNFs transfer KPIs and PCIs in SDN signaling the PCI intake engine in the PCI host. The PCI intake engine also processes the KPIs and PCIs to generate PCIs based on PCI configurations.

The SDN switches implement PCI configurations that apply thresholds to PCIs and take corresponding SDN actions when the PCI thresholds are breached. The SDN switches transfer PCI information characterizing the PCI threshold breaches to the SDN controller VNFs. The SDN controller VNFs implement PCI configurations that apply thresholds to PCIs and take corresponding SDN actions when the PCI thresholds are breached. The SDN controller VNFs transfer PCI information characterizing all of these PCI threshold breaches to the PCI distributor in the PCI host.

Advantageously, the PCI distributor in the PCI host distributes PCI information about the PCI threshold breaches to the SDN controller VNFs and to the SDN switches in the data-plane. Consider an example where the edge SDN switch on the left implements a PCI configuration having specific KPI/PCI inputs, PCI algorithms, algorithm thresholds, and corresponding SDN actions upon breach. The edge SDN switch detects a PCI threshold breach and transfers SDN signaling characterizing the PCI threshold breach to an SDN controller VNF in the edge NFVI on the left. The SDN controller VNF transfers SDN signaling characterizing the PCI threshold breach to the PCI distributor in the PCI host.

The PCI distributor in the PCI host receives SDN signaling from the SDN controller VNF characterizing the PCI threshold breach in the edge SDN switch. The PCI distributor in the PCI host generates PCI information that characterizes the PCI threshold breach. The PCI information indicates the specific KPI/PCI inputs, algorithms, thresholds, breaches, breach frequency, actions taken, and the like. The PCI information typically correlates the PCI threshold breach to a specific subnetwork, data service, user group, geographic area, data-plane machine, and the like.

The PCI distributor in the PCI host selects SDN controller VNFs and SDN switches to receive the PCI information. In this example, the breach data yields the core SDN switches. The PCI distributor in the PCI host then transfers SDN signaling having the PCI information to the SDN controller VNFs in the core NFVI. The SDN controller VNFs in the core NFVI transfer SDN signaling having the PCI information to the core SDN switches.

The core SDN switches use the PCI information. For example, the PCI threshold breach in the edge SDN switch could be a PCI input to a PCI algorithm running in the core SDN switches. The distribution of PCI information in the SDN data-plane enables distributed PCI configurations across the data-plane. These SDN-wide PCI configurations can be used to load balance data services, defeat security threats, enforce service quality, and the like.

Figure 6:
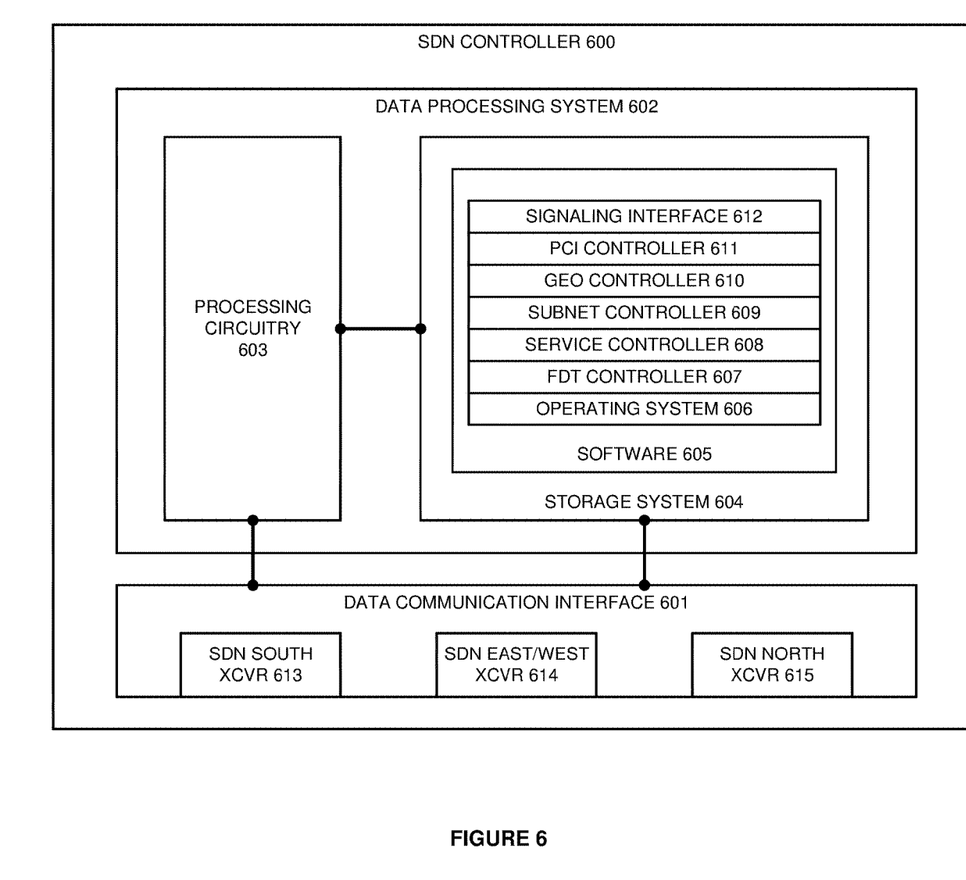
FIG. 6 illustrates an SDN controller to distribute PCI information across an SDN data-plane.

FIG. 6 illustrates SDN controller 600 to distribute PCI information across an SDN data-plane. SDN controller 600 is an example of SDN controller 141, although controller 141 may use alternative configurations and operations. SDN controller 600 comprises data communication interface 601 and data processing system 602. Data communication interface 601 comprises SDN transceivers 621-623. Data processing system 602 comprises processing circuitry 603 and storage system 604. Storage system 604 stores software 605. Software 605 includes respective software modules 606-612.

SDN machine transceivers 621-623 comprise communication components, such as ports, bus interfaces, signal processors, memory, software, and the like. Processing circuitry 603 comprises server blades, circuit boards, bus interfaces, CPUs, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed.

SDN controller 600 may be centralized or distributed. All or portions of software 606-612 may be externally stored on one or more storage media, such as circuitry, discs, and the like. Some conventional aspects of SDN controller 600 are omitted for clarity, such as power supplies, enclosures, and the like. When executed by processing circuitry 603, software modules 606-612 direct circuitry 603 to perform the following operations.

Operating system 606 interfaces between software modules 607-612 and the controller hardware (data communication interface 601, processing circuitry 602, RAM, storage). File Description Table (FDT) controller modules 607 direct FDT tasks in SDN data-plane switches like packet forward, store, and drop. Service controller modules 608 direct FDT controller modules 607 to implement service-level FDT changes. Network controller modules 609 direct FDT controller modules 607 to implement network-level FDT changes. Geo controller modules 610 directs FDT controller modules 607 to implement geo-level FDT changes. PCI controller modules 611 transfer PCI configurations and distribute PCI information about PCI threshold breaches. SDN signaling interface 612 uses open flow or the like to handle SDN signaling for modules 607-611 over transceivers 621-623 for respective south, east/west, and north SDN signaling.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Software-Defined Network (SDN) to distribute Proxy Correlation Index (PCI) information across an SDN data-plane, the method comprising:
   a source data plane machine generating Key Performance Indicator (KPI) data, processing the KPI data to generate PCIs, detecting a PCI threshold breach, and transferring inbound SDN signaling for delivery to a source SDN controller serving a source geographic area indicating the PCI threshold breach in the SDN data-plane in the source geographic;
   the source SDN controller receiving the inbound SDN signaling from the source data plane machine and responsively transferring the inbound SDN signaling for delivery to a central SDN controller;
   the central SDN controller receiving the inbound SDN signaling from the source SDN controller, generating the PCI information that characterizes the PCI threshold breach, selecting a target SDN controller in a target geographic area responsive to the PCI threshold breach, and transferring outbound SDN signaling having the PCI information for delivery to the target SDN controller in the target geographic area; and
   the target SDN controller receiving the outbound SDN signaling having the PCI information and transferring the outbound SDN signaling having the PCI information for delivery to one or more target data plane machines in the target geographic area.

2. The method of claim 1 wherein the central SDN controller generating the PCI information comprises indicating at least one of a PCI threshold for the PCI threshold breach, a PCI algorithm causing the PCI threshold breach, a breach frequency for a PCI threshold breach, an SDN subnet having the PCI threshold breach, an SDN data service having the PCI threshold breach.

3. The method of claim 1 wherein the central SDN controller selecting the target SDN controller comprises selecting the target SDN controller based on the source geographic region and an SDN subnet having the PCI threshold breach.

4. The method of claim 1 wherein the central SDN controller selecting the target SDN controller comprises the central SDN controller selecting the target SDN controller based on an SDN service having the PCI threshold breach.

5. A Software-Defined Network (SDN) to distribute Proxy Correlation Index (PCI) information across an SDN data plane, the SDN comprising:
   a source data plane machine comprising program instructions, that when executed by one or more processors, direct the one or more processors to generate Key Performance Indicator (KPI) data, process the KPI data to generate PCIs, detect a PCI threshold breach, and transfer inbound SDN signaling for delivery to a source SDN controller serving a source geographic area indicating the PCI threshold breach in the SDN data-plane in the source geographic;
   the source SDN controller configured to receive the inbound SDN signaling from the source data plane machine and responsively transfer the inbound SDN signaling for delivery to a central SDN controller;
   the central SDN controller configured to receive the inbound SDN signaling from the source SDN controller, generate the PCI information that characterizes the PCI threshold breach, select a target SDN controller in a target geographic area responsive to the PCI threshold breach, and transfer outbound SDN signaling having the PCI information for delivery to the target SDN controller in the target geographic area; and
   the target SDN controller configured to receive the outbound SDN signaling having the PCI information and transfer the outbound SDN signaling having the PCI information for delivery to one or more target data plane machines in the target geographic area.

6. The SDN controller of claim 5 wherein the central SDN controller configured to generate the PCI information comprises the central SDN controller configured to indicate at least one of a PCI threshold for the PCI threshold breach, a PCI algorithm causing the PCI threshold breach, a breach frequency for a PCI threshold breach, an SDN subnet having the PCI threshold breach, an SDN data service having the PCI threshold breach.

7. The SDN controller of claim 5 wherein the central SDN controller configured to select the target SDN controller comprises the central SDN controller configured to select the target SDN controller based on the source geographic region and an SDN subnet having the PCI threshold breach.

8. The SDN controller of claim 5 wherein the central SDN controller the central SDN controller configured to select the target SDN controller comprises the central SDN controller configured to select the target SDN controller based on an SDN data service having the PCI threshold breach.

\* \* \* \* \*